No. 812,470. PATENTED FEB. 13, 1906.
T. N. WOOLVERTON.
FRUIT SORTER.
APPLICATION FILED FEB. 25, 1905.
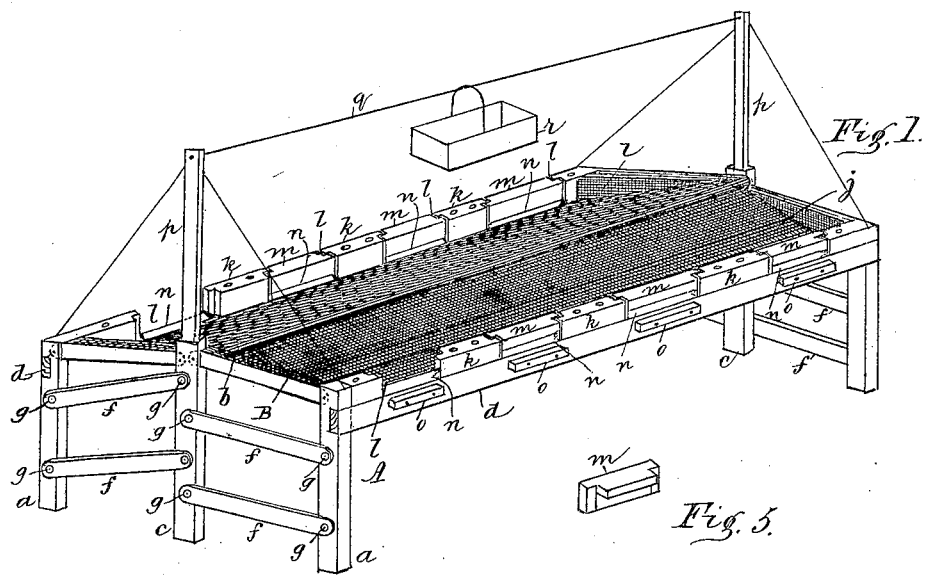
Fig. 1.
Fig. 5.
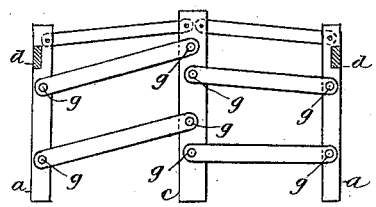
Fig. 3.
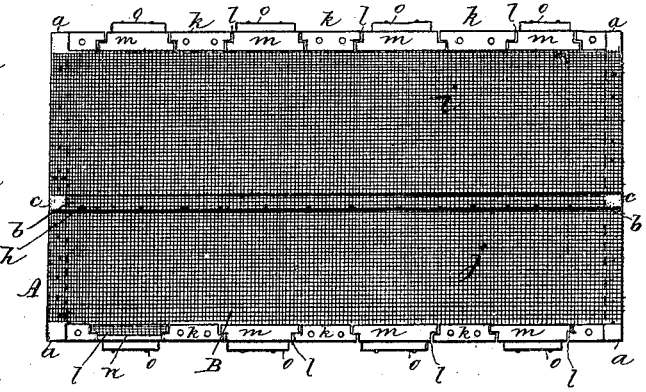
Fig. 2.
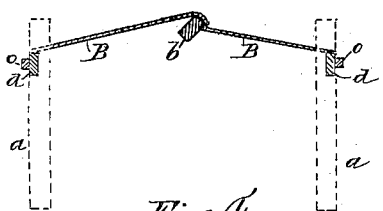
Fig. 4.
Witnesses
Geo. A. Filman
F. M. Laird.
Inventor
T. N. Woolverton
By W. Bruce
Atty

UNITED STATES PATENT OFFICE.

THEORON NIXON WOOLVERTON, OF GRIMSBY, CANADA.

FRUIT-SORTER.

No. 812,470.      Specification of Letters Patent.      Patented Feb. 13, 1906.

Application filed February 25, 1905. Serial No. 247,231.

*To all whom it may concern:*

Be it known that I, THEORON NIXON WOOLVERTON, a citizen of the Dominion of Canada, residing at Grimsby, in the county of Lincoln, in the Province of Ontario, Canada, have invented a certain new and useful Fruit-Sorter; and I do hereby declare that the following is a full, clear, and exact description of the construction and operation of the same.

The invention relates to a very convenient, portable, and economical labor-saving machine for sorting fruit of all kinds by which two or more operators skilled in its use are enabled to sort three or four times as much fruit in a given time and do it more accurately than under any other system.

Reference is made to the accompanying drawings, in which—

Figure 1 is a perspective view of the device embodying my invention. Fig. 2 is a plan view of the same. Fig. 3 is an end view. Fig. 4 is a cross-section through the center. Fig. 5 is a side view of one of the gates detached, in perspective.

Similar letters refer to similar parts throughout the several views.

In the drawings, A represents a rectangular frame standing on six legs $a\ c$, cut to a convenient height, about that of an ordinary table, and so arranged and constructed that it can be folded in a small compass for transportation or storage. A center ridge-piece $b$ connects the two center legs $c\ c$ at each end, and the two side pieces $d\ d$ connect the outer legs $a\ a$ at each end, as shown. A series of braces $f$ connect the outer legs $a\ a$ with the center leg $c$ at each end and are pivoted thereto by round bolts $g$, so as to enable the frame to be folded lengthwise in smaller compass for the purpose hereinbefore specified. The said frame, which is designated entire by the letter A, has its top covered with canvas B or its equivalent material, which is stretched across the frame and fastened to the sides and ends and partially wound around and fastened to the ridge-piece $b$ by nails or tacks $h$, and thus form two large longitudinal pockets or receptacles $i\ j$ with outward-sloping bottoms for the reception of fruit to be sorted.

A series of stationary blocks $k$ are fastened at intervals along the top edge of the sides $d\ d$ of the frame, so as to allow a series of openings $l$, which are closed when desired with a series of movable gates $m$, the ends of which may be notched in the blocks, as shown, or otherwise secured. They serve the purpose to hold the fruit in both receptacles $i\ j$ and are removed easily to allow the sorted fruit to be drawn off into boxes, bags, barrels, &c.

A series of raised lips $n$ are formed at the sides $d$ of the frame between the retaining-blocks $k$ for the purpose of preventing leaves (if there are any) from being drawn off with the sorted fruit. The inside of each said lip is beveled, so as to allow the fruit easy escape to the receptacles placed to receive it. Below each lip $n$ a cleat $o$ is fastened to the sides of the frame to assist in retaining the receptacle in place during the process of drawing off the fruit.

Two standards $p\ p$ will be attached to the ends of the machine, carrying a rod $q$, on which is made to slide a basket or box $r$ to receive the absolutely bad fruit. The said basket or box $r$ will be removable, when desired, from the rod $q$, and the standards $p\ p$ will be effectively braced to carry the weight of the basket and contents.

The operation of sorting the grades of fruit with the above-mentioned machine may be particularly described as follows: The secret of successful speed and accuracy in sorting fruit is to use a sorter that makes it possible for the operator to employ the principle of concentration of mind during the work and by which the eye and hand become trained to perform the operation of sorting with skill and correctness. The three grades of fruit, as No. 1, No. 2, and No. 3, are easily separated on my sorter without confusion and with accuracy and despatch. At the same time the fruit will not be liable to injury, and much labor is saved in the operation, which when began the fruit (after the gates are closed) is dumped into the pocket or receiving-section $j$ of the machine. The first-class fruit is left there for the time being, the second-grade fruit is picked out and thrown over the center bar $b$ into the opposite receiving-section $i$, and the third grade of fruit is tossed into the receptacle $r$, carried on the rod $q$, supported by the standards $p\ p$. When the pocket-sections $i$ and $j$ are full of fruit, it is drawn off into boxes, bags, or barrels, &c., as desired, by placing the receptacles opposite the gates $m$, which when removed the fruit rolls into the said receptacles without damage in the slightest degree. The contents of both pockets may be removed therefrom at the same time by unskilled attendants.

Having thus described my device and its advantages, what I claim as my invention, and desire to secure by Letters Patent, is—

In a fruit-sorter, a rectangular frame, supported by six legs, the legs at each end connected with pivoted braces so as to be capable of folding, a longitudinal center piece connecting the ends higher than the sides, a woven material covering the top of the frame, sloping to the sides and form fruit-pockets, a series of blocks secured to the sides at intervals to form raised sides for the pockets, a series of openings between said blocks, a series of removable gates to fit in said openings, a series of lips at the bottom of each gate-opening, a series of cleats secured to the sides under each gate-opening, standards affixed to the ends of the frame, a rod made to connect said standards to carry a removable fruit-receptacle, all constructed, combined and arranged substantially as and for the purpose specified.

Hamilton, Ontario, Canada, January 11, 1905.

THEORON NIXON WOOLVERTON.

In presence of—
  BERT COULSON,
  WM. BRUCE.